United States Patent [19]

Gladon

[11] 4,363,639

[45] Dec. 14, 1982

[54] GAS TRAP FOR REMOVING ATMOSPHERIC POLLUTANTS AND METHOD OF OPERATION

[75] Inventor: Richard J. Gladon, Ames, Iowa

[73] Assignee: Iowa State University Research Foundation, Inc., Ames, Iowa

[21] Appl. No.: 242,055

[22] Filed: Mar. 9, 1981

[51] Int. Cl.³ .................... B01D 47/02; G01N 31/06
[52] U.S. Cl. ......................................... 55/95; 55/256; 422/94; 422/101; 422/88; 73/23; 73/863.21; 261/122
[58] Field of Search .................. 55/95, 225, 246, 249, 55/255, 256; 261/122, 124, 126; 422/88, 94, 101; 73/23, 28, 863.21; 423/210

[56] References Cited

U.S. PATENT DOCUMENTS

| | | |
|---|---|---|
| 1,891,625 | 12/1932 | Hull ............................... 55/256 |
| 2,014,823 | 9/1935 | Tramm . |
| 2,116,442 | 5/1938 | McCluer ......................... 422/101 |
| 2,485,739 | 10/1949 | Johnstone ........................ 261/122 |
| 2,510,532 | 6/1950 | Udale . |
| 2,829,032 | 4/1958 | Barley . |
| 2,895,092 | 7/1959 | Clowen . |
| 3,283,900 | 11/1966 | Sloan . |
| 3,365,599 | 1/1968 | Brzezinski et al. . |
| 3,387,707 | 6/1968 | Smith . |
| 3,495,440 | 2/1970 | Kobun et al. ....................... 55/95 |
| 3,540,852 | 11/1970 | Gorne et al. ...................... 55/256 |
| 3,709,471 | 1/1973 | Trefzer ............................. 261/124 |
| 4,183,728 | 1/1980 | Lietzke . |
| 4,208,912 | 6/1980 | Baldeck . |
| 4,224,828 | 9/1980 | Steinke ............................ 55/246 |

FOREIGN PATENT DOCUMENTS

| | | |
|---|---|---|
| 807491 | 3/1969 | Canada . |
| 2280421 | 2/1976 | France ............................. 261/124 |
| 272092 | 6/1927 | United Kingdom ................. 422/88 |
| 2037180 | 7/1980 | United Kingdom ................. 55/244 |

Primary Examiner—David L. Lacey
Attorney, Agent, or Firm—Zarley, McKee, Thomte, Voorhees & Sease

[57] ABSTRACT

A gas trap for removing pollutants from gases which includes a vertically disposed, hermetic, double bulb enclosure wherein said bulbs are connected by a restricted passageway. A bubble tube that terminates in a fritted lower end is centrally disposed within said enclosure and extends adjacent to the bottom thereof. The enclosure is filled to approximately the midpoint of the upper bulb with pollutant reactant which removes selected pollutants from gases bubbled through the trap. In the method a polluted gas enters the bubble tube and exits the fritted end as bubbles which rise through the reactant solution to the restricted passageway. There, the rising gas is delayed due to the reduced cross-section of the enclosure and thus remains in contact with the reactant longer than if the flow path were unrestricted. The additional contact time between the polluted gas and the reactant allows more pollutant to be absorbed by the solution, thereby enhancing the trapping process. The size of the holes in the fritted material and the degree of restriction of the flow path are adjusted to substantially prevent back pressure from occurring in the system which would impede the flow of the gas being treated, but still allow virtually complete absorption of the pollutant by the reactant solution.

7 Claims, 4 Drawing Figures

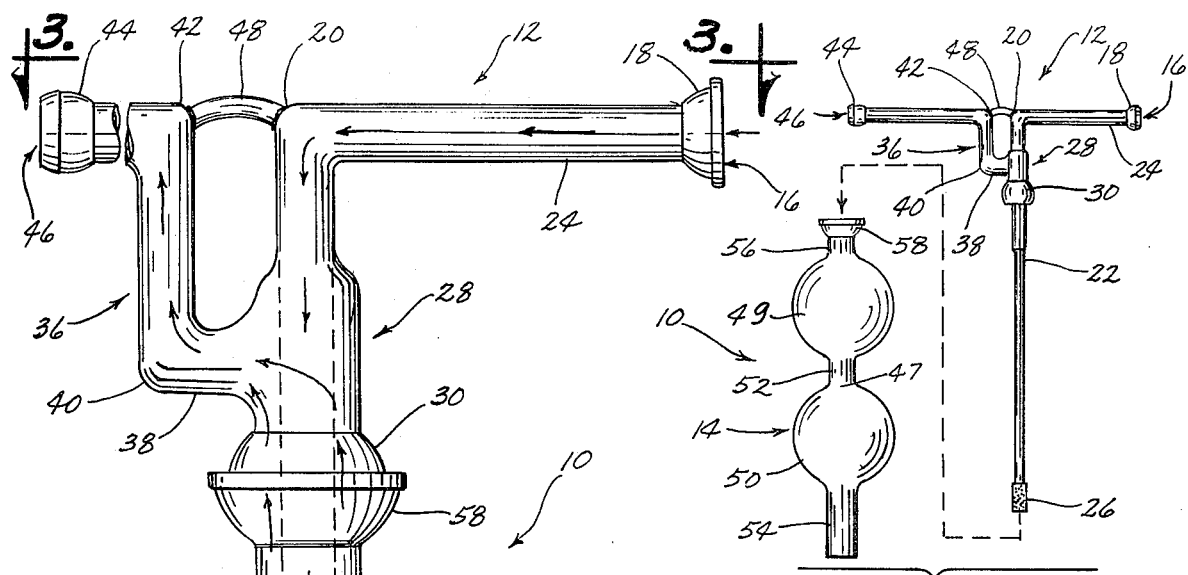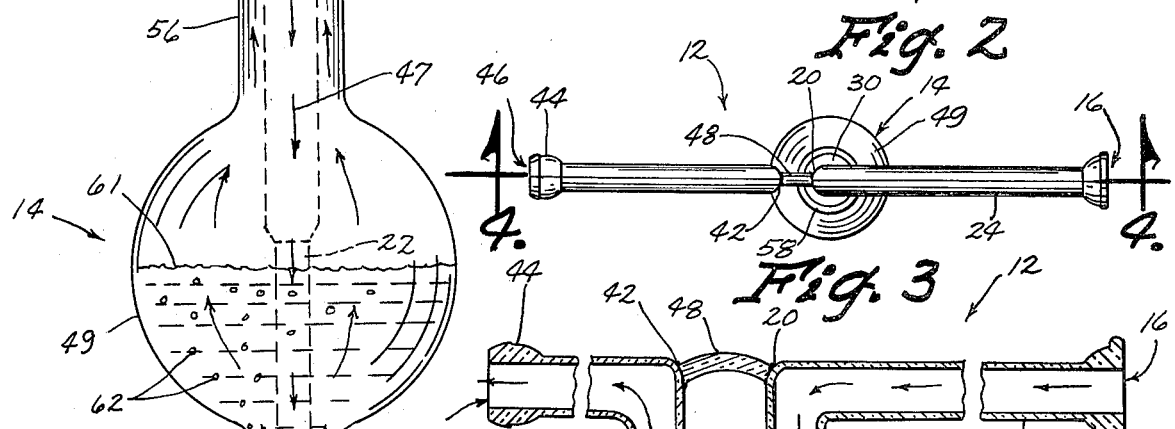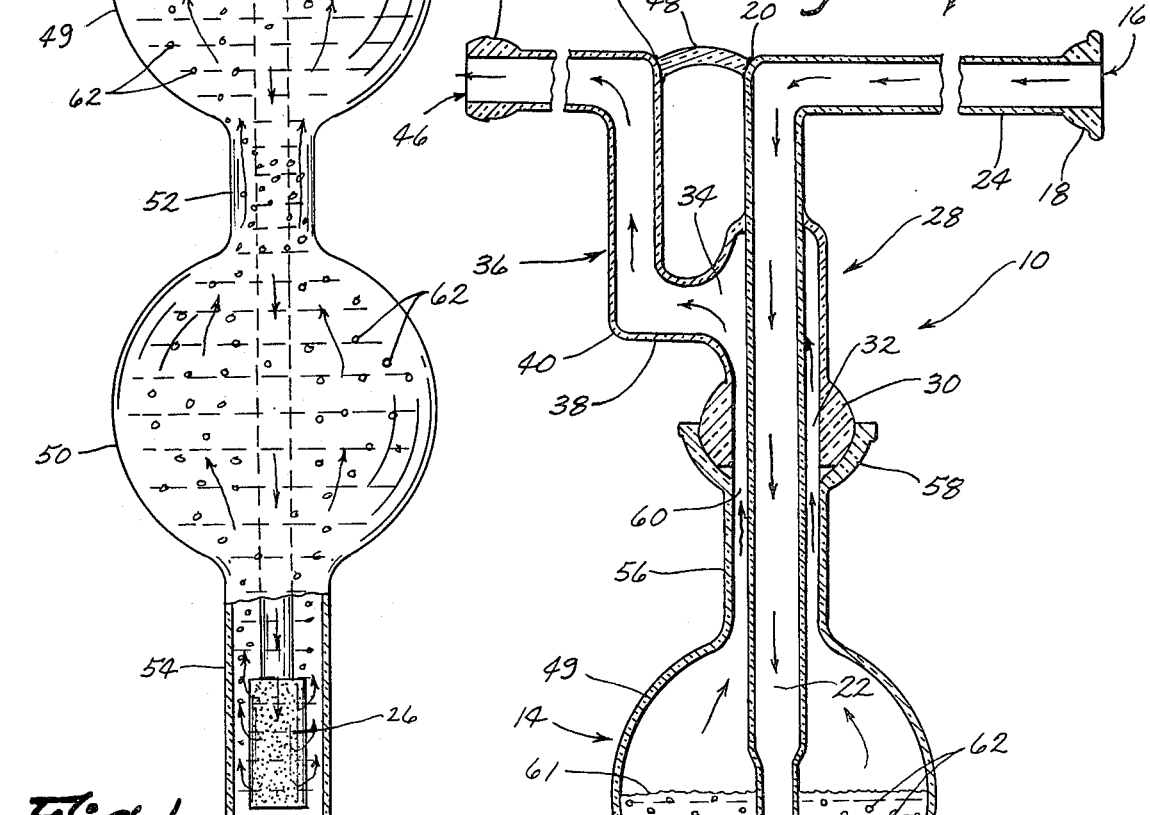

GAS TRAP FOR REMOVING ATMOSPHERIC POLLUTANTS AND METHOD OF OPERATION

BACKGROUND OF THE INVENTION

Prior gas traps contain bubble tubes which extended into reactants which removed selected pollutants from gas cycled through these devices. Fritted ends have also been employed on the bottom of such bubble tubes. Purification was accomplished by the reactant trapping the pollutants in amounts related to reactant concentration and in proportion to the time the gas to be treated was exposed to the reactant.

These prior structures varied in efficiency and disadvantages remained with all. One common disadvantage was that too little of the reactant in the enclosure was actually exposed to the polluted gas as the gas bubbled to the surface. A related common disadvantage was that the gas passed quickly through the reactant fluid, thereby not giving the cleansing reaction time to occur with respect to much of the pollutant. Due to these disadvantages, for a given reactant, the desired purification reaction would either be only partially completed or not occur at all for many of the polluted gas bubbles. Additionally, these disadvantages in turn limited the gas flow rates which could be utilized with the prior gas traps. Dramatic drops in efficiency commonly occurred for prior gas traps when flow rates exceeded 25 milliliters per minute.

The present invention alleviates the disadvantages indicated above by delaying the polluted gas within the reactant during its rise by causing the reactant and the bubbles to roll for a brief time at the base of the restricted passageway. The shape of the enclosure and the position of the restricted passageway relative to the lower chamber, alone accomplish this improved result. Complications such as valves and mutliple compartments within the trap are avoided. Further, by an appropriate choice of cross-sectional dimensions for the restricted passageway, for certain pollutants and reactants, flow rates as high as 300 milliliters per minute can be utilized while retaining a high degree of efficiency.

BRIEF DESCRIPTION OF THE DRAWINGS

FIG. 1 is a side view of the assembled apparatus including a partial sectional view.

FIG. 2 is an exploded side view of the apparatus.

FIG. 3 is a plan view of the upper member of the apparatus.

FIG. 4 is a sectional view of a portion of the upper member of the apparatus along line 4—4.

SUMMARY OF THE INVENTION

Two blown glass members are adjoined to provide a hermetic trap for atmospheric pollutants. The upper member includes an inlet leading to a vertically disposed elongated bubble tube. The lower end of the tube is encased by a fritted material. An outlet is formed in the upper member by connecting a glass tube to the side of a bell shaped envelope. The bubble tube depends through and is connected to the top of the bell shaped envelope. A ground glass collar forms the bottom of said bell shaped envelope and is concentrically disposed in spaced relation to the depending bubble tube.

The lower member has two bulbs vertically disposed and joined by a restricted passageway. It is symmetrical about a vertical axis. A flattened nipple adapted to receive said fritted end in spaced relation protrudes from and forms the lowermost portion of the bottom. A ground glass socket adapted to receive the ground glass collar of the upper member is connected to the top of the lower member.

When assembled, the fritted end depends along the vertical axis of the lower member in spaced relation to the sides and bottom of the nipple. The reactant fills the upper bulb to approximately the midpoint. Gas to be tested is drawn through the apparatus by pulling a vacuum on the outlet.

The principal object of the present invention is to increase efficiency of the gas trap by prolonging the time gas to be tested is in contact with contained reactants.

Another object is to provide a trap that does not require additional mechanisms to increase the efficiency of present traps.

A further object is to provide a gas trap which is easily cleaned.

Another object is to provide a gas trap with said increased efficiency being maintained for high gas flow rates.

DETAILED DESCRIPTION OF THE INVENTION

Gas trap 10 for atmospheric pollutants is comprised entirely of glass, and includes an upper member 12 which defines the flow path of the gas to be treated to a lower double bulb enclosure 14 (FIGS. 1 and 2). Trap 10 could also be composed of quartz, or member 12 and enclosure 14 could individually be quartz or Pyrex brand glass.

Upper member 12 includes an inlet 16 (FIG. 3) formed by a central bore in a ground glass socket 18. Inlet 16 is connected at right angle junction 20 (FIGS. 1 and 2) to an elongated vertically disposed bubble tube 22 by an inlet tube 24. Bubble tube 22 has a coarse fritted cylindrical member 26 secured to and encasing its open, lower end. Member 26 could include a very fine, medium or very coarse fritted material, but as discussed further below, a coarse fritted material is preferred.

Bubble tube 22 (FIGS. 1 and 2) depends through the center of a bell shaped chamber 28. Bubble tube 22 penetrates the top of chamber 28 and is glass blown to hermetically seal the top of chamber 28 to the exterior of bubble tube 22 at a point below junction 20. A ground glass hemisphere 30 with central bore 32 flares out to form the bottom of and complete the bell shape of chamber 28. Glass hemisphere 30 thus provides a ground glass collar concentrically disposed in spaced relation to bubble tube 22.

A hole 34 is located in the side of chamber 28 (FIG. 4) approximately midway between the top of glass hemisphere 30 and the top of chamber 28. Outlet tube 36 encloses hole 34. Tube 36 includes a short, horizontally disposed segment 38 that turns a right angle at junction 40 and extends to the level of inlet tube 24. At said level, tube 36 forms another right angle at junction 42 and extends horizontally and radially outward to join with and terminate at ground glass hemisphere 44. Hemisphere 44 has a central outlet bore 46. Solid glass cross bar 48 spans the gap between junction 20 and junction 42, to provide additional strength to member 12.

Double bulb member 14 is symmetric with respect to a central vertical axis 47 (FIGS. 1 and 2). Member 14 includes two vertically disposed glass bulbs 49 and 50 joined by a centrally located, restricted passageway 52 (FIGS. 1 and 2). The bottom of lower bulb 50 opens to and is sealed by a flat bottom nipple 54. The top of upper bulb 49 opens to and joins an upper passageway 56 which terminates in a ground glass socket 58. Socket 58 has a central bore 60. Socket 58 is adapted to receive glass hemisphere 30 and to form a hermetic seal. A thin layer of vacuum stopcock grease is found to be useful in completing this seal.

When gas trap 10 is assembled (FIG. 1), bubble tube 22 depends along central vertical axis 47. Additionally, it is preferred that the dimensions of member 14 be such that at least a three millimeter gap is present between the interior of restricted passageway 52 and the exterior of bubble tube 22 on each side of said tube. For the circular cross sectional configuration of passageway 52 herein described, it is found that this gap size will provide a flow path large enough to substantially prevent back pressure from being created below passageway 52. Such back pressure could impede the flow of gas being tested.

Similarly, to avoid back pressure, at least a five millimeter gap is preferred between the interior of nipple 54 and the exterior sides and bottom of fritted cylindrical member 26. Coarse fritted material is preferable for member 26 because extra or super finely fritted glass can cause undesirable back pressure within bubble tube 22 when the system is in operation, and very coarsely fritted material allows bubbles too large to be efficiently scrubbed of the pollutant by the reactant solution.

As an upper dimensional limit, passageway 52 must not be so large as to afford a completely free flow path to gas bubbling up from fritted member 26. It is important that the free flow of such gas bubbles be impeded to some degree by the restricted cross-section of passageway 52. It is preferable to impede the flow to the extent that the bubbles and reactant roll and mix for a brief time at the base of passageway 52.

The best results have been obtained with the following dimensions. Bulbs 49 and 50 are spherical and approximately 200 milliliters in volume. Passageway 52 is three centimeters long with three to four millimeters on each side of bubble tube 22 between the exterior of said tube and the interior of passageway 52. Nipple 54 allows five millimeters between its interior surface and the exterior of the bottom and sides of coarse fritted member 26. With said dimensions, gas bubbles containing, for example, ethylene as a pollutant have had over 99% of the ethylene removed at gas flow rates as high as 300 milliliters per minute (mercuric perchlorate was utilized as the reactant).

In operation, double bulb member 14 is filled with a suitably chosen reactant to approximately the midpoint of upper bulb 49. The reactant choice is governed by the pollutant the operator wishes to remove. For example, mercuric perchlorate is recommended for ethylene and sodium hydroxide is a good choice to react with carbon dioxide. Upper member 12 is placed into contact with lower member 14 and glass hemisphere 30 and socket 58 are sealed. A container including a gas sample to be tested is secured to inlet tube 24. A vacuum pump is attached to outlet tube 36 and a vacuum is pulled on the now closed system. The reduced pressure above the surface 61 of the reactant draws the gas sample through inlet 16 and down bubble tube 22.

Initially some reactant will move through fritted member 26 up into bubble tube 22 due to the pressure of the reactant at the bottom of double bulb member 14. When the vacuum is pulled, the pressure of the gas sample being drawn into bubble tube 22 will clear the reactant from the bubble tube. Fritted member 26 will form the gas sample into relatively small bubbles 62 by forcing the gas through the coarse holes therein. Small bubbles allow more gas surface area to come into contact with the reactant, but coarse fritting is preferred to avoid the back pressure problems discussed above. Since fritted member 26 is symmetric with respect to the central vertical axis 47, it will disperse bubbles 62 uniformly about said axis as well as through the bottom of member 26.

Bubbles 62 will rise towards passageway 52. Typical gas flow rates which can be pulled by the vacuum are from 25 milliliters per minute to 300 milliliters per minute. The faster the flow rate, due to the higher vacuum above surface 61, the more the path of bubbles 62 will bow out towards the walls of lower bulb 50 as they travel upwards.

As passageway 52 is approached, the restricted flow path available to the bubbles 62 will cause the rising bubbles to slow. In fact, the bubbles will roll about for a brief time entraining nearby reactant at a point just below the entrance to passageway 52. The fluid dynamics thus prolong the time the polluted gas bubbles 62 are in contact with the reactant, thereby increasing the probability that the pollutant will react with the reactant, be captured by the reactant solution, and thus be removed from the polluted stream of gas.

The bubbles eventually work their way to surface 61 and are drawn off by the vacuum in the form of now purified gas. Gas trap 10 can be utilized, for example, to remove the following atmospheric pollutants: carbon dioxide ($CO_2$), ethylene ($CH_2=CH_2$) sulfur dioxide ($SO_2$), carbon monoxide (CO), hydrogen sulfide ($H_2S$), ozone ($O_3$), and PAN (peroxy acetyl nitrate).

The above listed pollutants, as well as the recommended dimensions are not given by way of limitation (unless expressly so indicated), but are merely stated as examples and suggestions. Further, the method of operation, as well as the structure of gas trap 10 can be varied greatly and perform in substantially the same manner to that indicated above. By way of further example, such variation could include a lower member with a single bulb wherein the upper bulb and upper passageway would be eliminated, or a lower member with a plurality of bulbs where adjacent bulbs are joined by a passageway. Similarly, the reactant could partially fill only the restricted passageway in either a single or double bulb embodiment. The volumes of the bulbs and the length of the restricted passageway could be varied, thus altering the volume of the reactant solution. However, for a given volume or level of reactant within a particular configuration, restriction of the flow path of the gas within the reactant at some point will greatly increase the trap's efficiency as disclosed by this invention.

Finally, the gas sample could be introduced into the trap at any point below the restricted point of the flow path. The preferred embodiment with the inlet and outlet on the same level is generally easier to secure to the commonly employed support stands, but trap 10 could be modified, if needed, such that the polluted gas could enter through a fritted member attached to the bottom of nipple 54. In this latter case, the inside diameter of restricted passageway 52 should be approximately three to four millimeters.

Thus it is seen that the invention accomplishes at least all of its stated objectives.

What is claimed is:

1. A gas trap, comprising, a vertically disposed hermetic enclosure having top and bottom portions with upper and lower chamber portions disposed therebetween, and a restricted diameter vertical passageway extending between and connected to said upper and lower chamber portions, said passageway having an effective flow path diameter substantially less than that of said upper and lower chamber portions, and wherein said enclosure is adapted to contain a reacting fluid for reacting with the pollutants in the gas to be tested, a discharge outlet and an inlet opening in said enclosure adjacent the top of said enclosure, said discharge outlet and inlet opening both being open for continuous gas flow into said input opening, through said enclosure and out of said discharge outlet, a noncapillary tube hermetically sealed to said inlet opening extending downwardly therefrom through and in spaced relation with said chamber portions and said vertical passageway and terminating adjacent the bottom of said lower chamber portion, a fritted material encasing the bottom of said tube, and a reacting liquid filling said enclosure to a point including at least the lower portion of said upper chamber, the space between said tube and said vertical passageway being less than the space between said tube and said lower chamber so that when gas is introduced into said tube and through said fritted material to enter said reacting fluid as gas bubbles, the upward movement of said gas bubbles will be prolonged by the restricted space between said passageway and said tube to provide a longer exposure time for said bubbles in said reacting fluid.

2. The gas trap of claim 1 wherein said passageway is symmetric about a central vertical axis and wherein said tube extends along said axis.

3. The gas trap of claim 2 wherein the space between said tube and said vertical passageway is between three and four millimeters in width.

4. The gas trap of claim 1 wherein the space between said tube and said vertical passageway is such that the upward movement of said gas bubbles causes said gas bubbles to roll at a point below the entrance to said passageway.

5. A method of removing pollutants from a continuous flow of gas comprising:

providing a hermetically restricted passageway with cross-sectional dimensions sufficiently small to prolong the free flow of gas bubbles rising in a liquid reactant and entering said passageway from a lower chamber of larger cross-sectional dimensions, but large enough to substantially prevent the creation of back pressure at the entrance to said passageway; said passageway being connected to a second, upper chamber of cross-sectional dimensions, substantially larger than said passageway, thereby forming a hermetic enclosure;

said lower chamber communicating with an inlet to said enclosure at a point below the entrance to said passageway and said upper chamber communicating with an outlet to said enclosure above said passageway, maintaining said inlet and outlet open for continuous gas flow into said inlet, through said enclosure and out of said outlet, filling said enclosure with a liquid reactant for reacting with said pollutants to a point including at least the lower portion of said upper chamber;

and introducing said continuous flow of gas into said enclosure below said passageway whereby gas bubbles are formed in and rise through said reactant;

whereby the upward movement of said gas bubbles is prolonged by the restricted passageway, thus providing a longer exposure time for said bubbles to said reacting fluid.

6. A gas trap comprising:

a hermetic enclosure having top and bottom portions and at least one vertically disposed and connected chamber therebetween, said enclosure further including a substantially vertical restricted passageway in communication with the top of said at least one chamber and the top portion of said enclosure, and wherein the largest cross-sectional dimension of said restricted passageway is substantially less than that of the largest cross-sectional dimension of said at least one chamber;

a reacting fluid filling said at least one chamber and substantially filling said passageway;

a discharge outlet in said enclosure above said passageway;

inlet means for introducing gas to be treated into said enclosure at a point below said passageway whereby said gas is formed into bubbles when said reactant fills said at least one chamber and substantially fills said passageway;

said discharge outlet and inlet means both being open for continuous gas flow into said inlet means, through said enclosure and out of said discharge outlet;

and the largest cross-sectional dimension of said passageway being small enough so as to impede the free flow of said gas bubbles at a point below said passageway but large enough to prevent substantial back pressure from being created in said gas trap due to said impeding; whereby the upward movement of gas to be treated, which is introduced into said enclosure is prolonged by the restricted passageway, thereby providing a longer exposure of the pollutants to the reacting fluid.

7. The gas trap of claim 6 wherein said largest cross-sectional dimension of said passageway is small enough so as to cause said gas bubbles to roll at a point below said passageway.

* * * * *